J. H. FORMAN.
Shovel Plow.
No. 8,721.
Patented Feb. 10, 1852
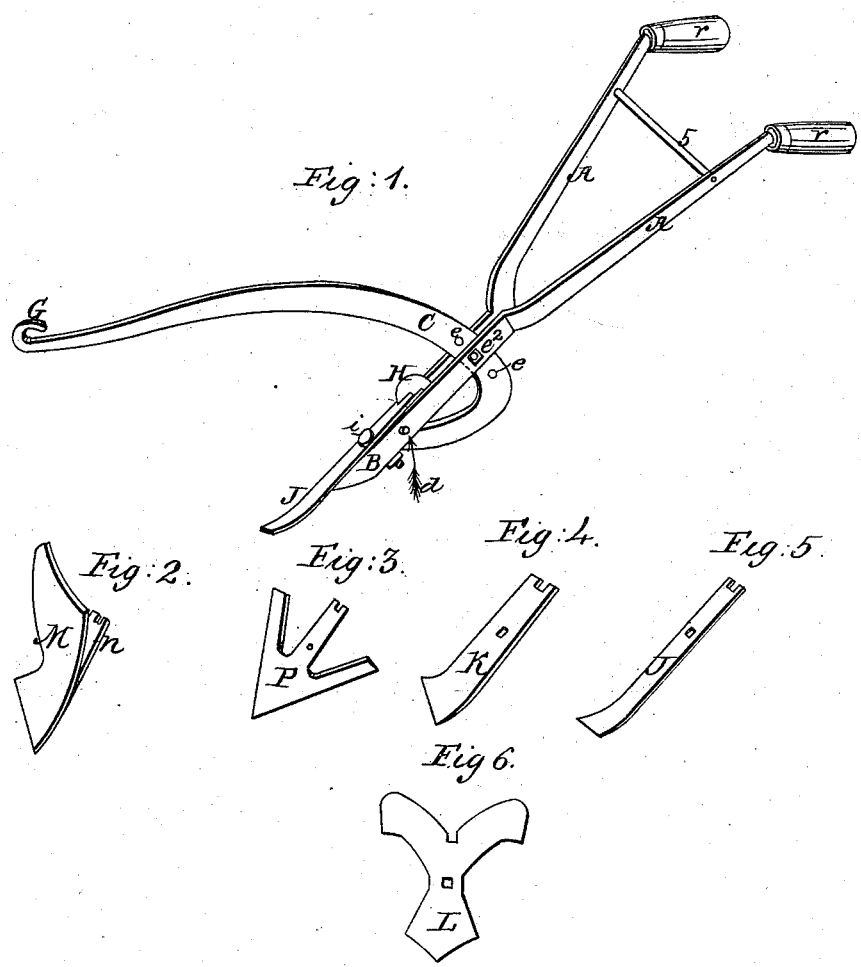
Witnesses.
John Smith.
John Jones
Inventor
J. H. Forman.

UNITED STATES PATENT OFFICE.

JAMES H. FORMAN, OF SHARON, ALABAMA.

IMPROVEMENT IN SHOVEL-PLOWS.

Specification forming part of Letters Patent No. 8,721, dated February 10, 1852.

*To all whom it may concern:*

Be it known that I, J. H. FORMAN, of Sharon, county of Chambers, State of Alabama, have invented a new and useful Improvement in the Construction of Plows; and I do hereby declare the following to be a full and exact description of the same.

The principle of my plow is a subsoil-plow for light southern soils, which do not require the turning-under system common among northern farmers, having a heavy sod to turn under and rot. It is therefore made light, and adapted so as to be used with one or two horses and with several varieties of adjustable shares, such as an opener, sweep, medium share, subsoil-share, and turning-share, which may be attached and detached from and to the plow-stock at a minute's notice for the several kinds of plowing required, and thereby saving the expense of extra stocks for the several kinds of work required of the plow.

But to describe my plow more particularly I will refer to the accompanying drawings, forming a part of this schedule, the same letters in the several drawings referring to the same parts wherever they occur.

Figure 1 is a perspective view of the plow having the subsoil-share attached thereto. Fig. 2 is a view of the turning-share. Fig. 3 is a view of the sweep. Fig. 4 is a view of the medium share. Fig. 5 is a view of the subsoil-share. Fig. 6 is a view of the opener.

Letters A A are the two handles of the plow-stock. These handles are made of iron or other material, of any suitable size and form required; but I prefer iron as affording the greatest amount of strength to the least weight. To their lower ends, at the foot of the plow-stock B, they are joined together, so as to form a solid end to the plow-stock. At a little distance from the end they open somewhat like a clamp for the purpose of passing the back end of the beam C between them. This beam is made of iron, and has its back end bent down somewhat in a hook shape, and by means of a bolt, $d$, passing through the foot of the plow-stock the end of the beam is clamped between the arms of the plow. At the commencement of the bend in the beam there are several adjusting-holes, $e\ e\ e$, through which a bolt, $e^2$, passes to clamp the arms firmly to the sides of the beam. These adjusting-holes are for the purpose of giving the required pitch to the plow, so as to plow deep or shallow, as may be desired.

Letter G is a hook at the end of the beam, for the purpose of connecting the plow to the horse.

Letter H is a hook or catch bolted or otherwise secured on the upper side of the plow-stock, for the purpose of holding the upper or back end of the plow-shares, and letter I is a bolt for passing through the shares and foot of plow-stock to hold them firmly in contact.

Letter J is the subsoil-share, which is represented as bolted to the plow-stock. With the subsoil-share one good horse is able to break the land from six to eight inches deep, and with the medium share K from four to five inches deep.

Letter L is the opener, which, when attached to the plow-stock, is used for throwing up high ridges or opening deep, wide furrows where the land has been previously broken.

Letter M is the turning-share, used for turning the soil when attached to the plow-stock by means of the brace $n$ on the lower side of the share.

Letter P is the sweep, which is used as a general cultivator or grass-killer, which it does without injuring the roots of the growing crop.

Letters $r\ r$ are two wooden handles to the arms of the plow-stock, and letter $s$ is a brace between the arms of the plow-stock.

Having now described my invention, I will state what I claim and desire to secure by Letters Patent.

What I claim, therefore, is—

The use of the fulcrum-pin $d$ and adjusting arrangement of the pin $e^2$, in combination with the beam and stock of a plow, for the purpose of regulating the dip of the plowshare, substantially as set forth.

JAMES H. FORMAN.

Witnesses:
ELLIOTT H. MEUSE,
JAS. F. MITCHELL.